United States Patent [19]

Melvin, Jr.

[11] Patent Number: 4,841,281
[45] Date of Patent: Jun. 20, 1989

[54] APPARATUS FOR CONTROLLING A SWITCHING AMPLIFIER

[75] Inventor: Waymon A. Melvin, Jr., Raleigh, N.C.

[73] Assignee: Westinghouse Electric Corp., Pittsburgh, Pa.

[21] Appl. No.: 64,148

[22] Filed: Jun. 16, 1987

[51] Int. Cl.$^4$ .......................................... H04M 11/04
[52] U.S. Cl. .............................. 340/310 A; 340/664; 361/93; 375/3.1
[58] Field of Search ..................... 375/17.55, 56, 3.1; 340/662–664, 310 A; 361/94, 93

[56] References Cited

U.S. PATENT DOCUMENTS

| | | | |
|---|---|---|---|
| 3,723,880 | 3/1973 | Van Gerwen | 375/17 |
| 3,911,415 | 10/1975 | Whyte | 340/310 A |
| 3,924,223 | 12/1975 | Whyte et al. | 340/310 R |
| 3,942,168 | 3/1976 | Whyte | 340/310 R |
| 3,962,547 | 6/1976 | Pattantyus | 179/2.5 R |
| 4,004,110 | 1/1977 | Whyte | 179/110 J |
| 4,032,911 | 6/1977 | Melvin, Jr. | 340/310 A |
| 4,355,303 | 10/1982 | Phillips et al. | 340/310 A |
| 4,357,598 | 11/1982 | Melvin, Jr. | 340/310 A |
| 4,645,956 | 2/1987 | Shuey | 307/562 |

Primary Examiner—Joseph A. Orsino
Assistant Examiner—Jill D. Jackson
Attorney, Agent, or Firm—G. E. Hawranko

[57] ABSTRACT

An apparatus for controlling the output of a switching amplifier includes a signal dividing circuit which generates a delayed replica of the carrier signal and a doubled signal having twice the carrier frequency. The doubled signal is effective for establishing a second time delayed signal relative to the first time delayed signal. The first and second time delayed signals are logically operated on so that a three state output representing the carrier signal is attained. A summing amplifier utilizes the two time delayed signals to generate this three state output whereby if the two time delayed signals are out-of-phase, a zero voltage is connected to the drive portion of the switching amplifier thereby limiting the output of the switching amplifier.

16 Claims, 5 Drawing Sheets

APPARATUS FOR CONTROLLING A SWITCHING AMPLIFIER

BACKGROUND OF THE INVENTION

1. Field of the Invention

This invention relates generally to an apparatus for controlling a switching type amplifier and more particularly, to an apparatus for controlling such a switching amplifier that can be used in power line communication systems such that, during fault conditions, the output current at the drive portion of the switching amplifier is limited.

2. Description of the Prior Art

The practice of utilizing a switching type power amplifier to provide an efficient power gain when interfacing digital circuits to linear requirements has proven effective for a wide range of applications. One such application is in the area of power line communication systems where an electric utility company desires to perform a load management operation from a central location, an example of such a load management operation being a load shedding command which the utility would use to shed a non-essential current consuming load from the power line during peak demand periods. To perform this operation, the utilities have typically employed techniques for coding the necessary commands and transmitting the information over the power line. In communicating such information over the power line, the communication technique of phase shift keying (PSK) has been utilized, one application which is representative of such technique is found in U.S. Pat. No. 3,911,415 issued on Oct. 7, 1975 to Whyte. In this patent, a baseband data message is used to modulate a carrier signal which typically has a frequency in the audio frequency range and for this example is chosen as 12.5 kilohertz, although it can be appreciated that other frequencies and coding techniques can be used as well. The resultant modulated carrier signal, which experiences a phase shift when the leading or trailing edge of the baseband signal occurs, is injected onto the 60 hertz current flowing in the power line. At a remote location, which can typically consist of a load management terminal for which the command is intended to be operative, a receiver demodulates the carrier signal. U.S. Pat. No. 4,355,303 which issued on Oct. 10, 1982 to Phillips et al. is representative of the type of receiver used at the remote locations of the power line communication system.

When the communication system must accommodate a large geographical area of operation, it has been necessary to utilize a signal repeater for receiving the transmitted signal and retransmitting such signal at a sufficient power level to be received at the most distant location. U.S. Pat. No. 3,962,547 which issued on June 8, 1976 to Pattantyus discloses such a signal repeater device.

At the central location where the load monitoring and shedding commands originate and the associated controls are assembled for transmission over the power line, the message is first used to modulate a carrier signal using the PSK method as previously discussed. Before being injected onto the power line, however, the squarewave signal must first be converted to an analog signal peculiar to the requirements of the power line. One technique for accomplishing this is by way of a switching type power amplifier which utilizes metal oxide semiconductor field effect transistors (MOSFET). The MOSFET transistor is utilized primarily because of its property for fast switching responses to changes in the input voltage waveform thereby providing an output signal which is synchronized with the phase and frequency of the input signal. In applying such technology to a power line communication system, it is necessary to consider the effects of short circuit and/or low impedance conditions at the output stage of the MOSFET transistor. The condition of the power line, whether of a normal conducting condition or of a fault type condition, is determinative of the magnitude of the switching amplifier current output. If a fault condition arises on the power line, the magnitude of the output current signal can fluctuate to the extent that a potentially destructive condition can occur at the output stage of the MOSFET transistor. In fact, if a sustained short circuit condition would exist, the switching transistors would over saturate causing excessive heating such that component failure would eventually result.

One approach to limiting the current at the output of the switching amplifier has been to introduce a burden having a preselectable impedance; this approach however suffers in that a significant amount of power is dissipated which also adds to the overheating problem. Additionally, to accomplish this approach, additional components are needed which unduly increases the cost of the switching amplifier.

Another approach to limiting the current at the output stage of the switching amplifier can be found in U.S. Pat. No. 4,645,956 which issued on Feb. 24, 1987 to Shuey. In this patent, the problem of overheating of the output transistors during fault conditions associated with the power line is recognized with the solution advanced therein involving detecting the occurrence of an overcurrent condition and reversing the drive of the output transistors at this time. For short durations of the short circuit or low impedance condition, this approach is effective for limiting the current flow through the switching transistors, however, this advantage has associated therewith, some increased harmonic content at the output waveform.

SUMMARY OF THE INVENTION

It is therefore an object of the invention to provide an apparatus for controlling the output of a switching type power amplifier which limits the current through the switching transistors during short circuit or low impedance conditions and furthermore, does not increase the waveform distortion at any time during operation of the switching amplifier.

In accordance with the principles of this invention, there is provided an apparatus for controlling the output of a switching amplifier which includes a means for generating the message to be transmitted over the power line, a means for dividing the message into two signals, the first of which is delayed in time by predetermined period of time, and the second of which is a synchronous, doubled signal; means for generating a second delayed signal by delaying the first delay signal by a preselectable delay time; means for sensing an overcurrent condition; means for generating a disable signal as a function of at least a sensed overcurrent condition; means for producing a first logic signal as a function of the time delayed first signal and the disable signal and a second logic signal as a function of the second delayed signal and the disable signal; and a means for summing the first and second logic signals such that if the first and second logic signals are out of phase, the output of the switching amplifier is limited.

The switching amplifier control apparatus also includes a means for limiting the current through the control circuitry for a preselected period of time following sensing of a power up condition or following the occurrence of a drop in the system operating voltage below a specific threshold value.

BRIEF DESCRIPTION OF THE DRAWINGS

FIGS. 4A-G are graphical representations of the various waveforms used in conjunction with the invention.

DESCRIPTION AND OPERATION

Figure 1:
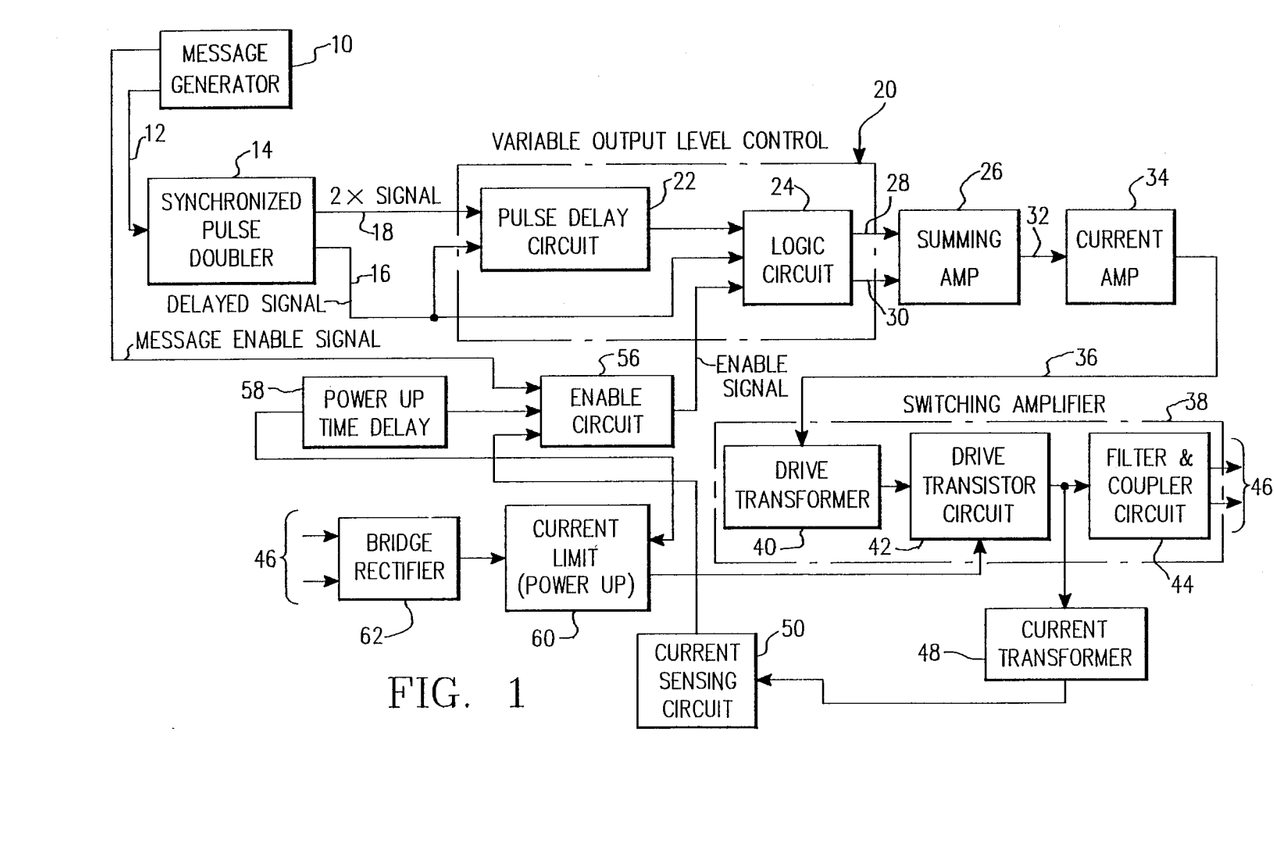
FIG. 1 is a diagrammatical view in block diagram form of a switching amplifier control apparatus constructed in accordance with the invention.

As seen in FIG. 1, the switching amplifier control apparatus includes a message generator element 10 which is effective for determining the contents of the message to be transmitted over the power line and for encoding this message in the PSK format. It should be noted that the message generator element 10 can be accomplished using a number of different circuit techniques; however, it is generally accepted that a microprocessor (not shown) best serves this purpose. The type of processor and the programming therefor are generally known in the art and can be accomplished using commercially available components and routines. As such, the understanding of the microprocessor and program is known to those skilled in the art and need not be herein presented. One output of the message generator 10 is a message enable signal which, if absent, acts as one means to disable operation of the switching amplifier; in other words, without the message enable signal from the message generator 10, the switching amplifier control apparatus that is the subject of this invention, cannot actuate the switching amplifier.

The carrier signal output of the message generator 10 is designated M1 and is fed over signal line 12 to the input of a synchronous pulse doubler element 14 which is effective for dividing the encoded carrier signal M1 into a first signal S1 which is delayed in time relative to the carrier signal M1 by a predetermined time factor and a second signal S2 which includes a pulse for each transition of the carrier signal M1. This second signal S2 therefore is a doubled signal having twice the frequency of the first signal S1 but being equivalent to the first signal S1 in both phase and magnitude. The second, doubled signal S2 is needed to insure the symmetry of the signal output from the switching amplifier control apparatus to the switching amplifier relative to the occurrences of the leading and trailing edges of the individual bit portions of the carrier signal M1.

Both the first delayed signal S1 and the second doubled signal S2 are fed into a variable output level control element shown in FIG. 1 as the upper dashed area and designated reference 20. The variable output level control element 20 includes a pulse delay circuit 22 and a logic circuit 24. The pulse delay circuit 22 receives the first delayed signal S1 over signal line 16 and the second, doubled signal S2 over signal line 18 and is effective for developing from these two signals, a second delayed signal S1A which is a replica of the first delayed signal S1 but is further delayed in time by a bit time factor determined in association with the second doubled signal S2, this bit time factor hereinafter being referred to as δ. This second delayed signal S1A is fed along with the first delayed signal S1 to logic circuit 24 where a logic operation is performed so that the two delayed signals S1 and S1A can be conditioned for input to summing amplifier circuit 26. However, before the two conditioned signals can be communicated to the summing amplifier 26, an enable signal must first be considered. The enable signal which has been previously described in relation to the message enable signal, can in short be described as the signal which also signifies whether a power up delay condition or a current limiting condition has occurred. If either of these conditions has occurred the output of the logic circuit 24 will be altered so as to disable the switching amplifier. Therefore, it can be appreciated that the enable signal can be removed under any of three distinct situations, all of which result in a shutdown of the switching amplifier; these three situations being: the absence of the message enable signal from the message generator 10, the running of a power-up time delay factor, and the sensing of a fault condition in the switching amplifier.

The summing amplifier 26 will receive the two logic signals in a manner such that a three state output can be derived therefrom. In this manner, it can be appreciated that two states can be utilized for the communication of the carrier signal M1 with the third state being utilized for disabling the switching amplifier during a short circuit or low impedance condition. These three states can be defined as a first state which occurs when the two delayed signals S1 and S1A are in phase as logical ones which thus results in a negative voltage output; a second state which occurs when the two delayed signals S1 and S1A are in phase as logical zeros which results in a positive voltage output; and a third state which occurs when the two delayed signals S1 and S1A are out-of-phase which results in a zero voltage output of the summing amplifier 26. The switching amplifier is configured so that when a zero voltage signal is input thereto, the drive portion which includes the MOSFET transistors, is disabled.

This potential three state output of the summing amplifier 26 is electrically connected over signal line 32 to a current amplifier 34 which is effective for amplifying the output signal to a level sufficient to actuate the switching amplifier shown in the lower dashed portion of FIG. 1 as reference 38. The switching amplifier 38 includes a drive transformer element 40, a drive transistor portion 42 which includes the MOSFET transistors, and a filter and coupler circuit 44 which is configured in a typical manner for filtering and line matching purposes.

A second current transformer 48 is connected to the switching amplifier 38 and is effective for intercepting a current value proportionate to the output current waveform, this intercepted current being used to sense the current-carrying condition of the power line 46 so that a fault condition can be recognized. This proportionate current signal is fed over feedback line 52 to a current sensing circuit 50 which converts the signal into a voltage signal and compares this result to a preselected reference voltage representing an overcurrent threshold. The output of the current sensing circuit 50 represents the previously described current-limiting signal and is connected over signal line 54 to an enable circuit 56 where it is logically ORed with the inverse of a power-up enable signal and the message enable signal from the message generator 10.

The enable circuit 56 generates the enable signal following expiration of a power up time delay established by a power up time delay circuit 58. This feature prevents a large in-rush of current to the switching amplifier power supply (not shown) upon first being powered up. The power up time delay is preselected and is further effective for preventing operation of the switching amplifier 38 even following expiration of the power up time delay if the message enable signal from the message generator 10 is received before the expiration of the power up time delay. In order for the message enable signal to initiate system operation, this signal must commence following expiration of the power up time delay; in this manner, a failure of the power up time delay circuit 58 will not result in prematurely enabling operation of the switching amplifier 38.

The power up time delay circuit 58 is also effective for enabling a power up current limiting circuit 60. The power up current limiting circuit 60 is effective during the power up time delay for limiting the charging current of a plurality of storage capacitors which supply the operating voltage for the drive transistor portion 42 of the switching amplifier 38. Following expiration of the power up time delay, the current-limiting capabilities of the power up current limiting circuit 60 is removed from active operation. Associated with the power up current limiting circuit 60 is a bridge rectifier 62 which is connected over a fusing element F1 to the power line 46 and which is electrically connected to the power up current limiting circuit 60 in a conventional manner to provide a source of energy for charging the storage capacitors. The switching amplifier 38 shown in the dashed area of FIG. 1 will now be more fully described in relation to FIG. 2 wherein elements previously described will retain the same reference numbers.

Figure 2:
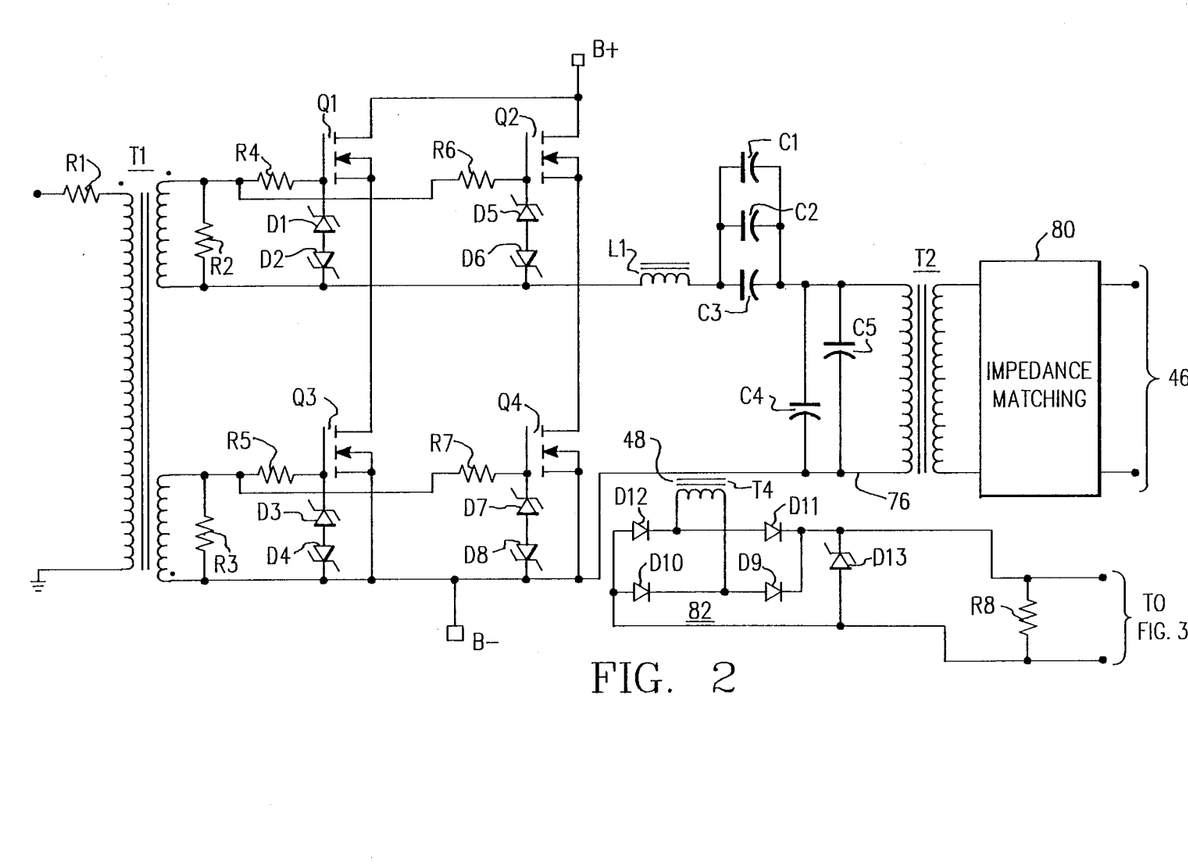
FIG. 2 is a schematic diagram of a switching amplifier for which the switching amplifier control apparatus is effective.

The three state output signal which represents the modulated encoded carrier signal M1 and is output through the switching amplifier control apparatus that is the subject of this invention, is connected to the switching amplifier 38 over a current limiting resistor R1 which is effective for establishing the maximum current for the drive transformer 40. The drive transformer 40 has a primary winding 70 and two equivalent but polar opposite secondary windings 72 and 74 which effectively segregate the drive transistor circuit 42 of the switching amplifier 38 into two portions which, as seen in FIG. 2, can be considered as an upper drive portion and a lower drive portion. It can be appreciated that the polar opposing arrangement of the two secondaries 72 and 74 are effective such that the upper and lower drive portions are 180° phase shifted relative to one another.

As noted, the secondary windings 72 and 74 are polarized relative to one another so that at a positive going input waveform, the upper drive portion is actuated and at a negative going input waveform, the lower drive portion is actuated and furthermore, when the input waveform is at a zero voltage level corresponding to the third state previously discussed, the upper and lower drive portions are both disabled. Connected across the terminals of both secondary windings 72 and 74 are resistors R2 and R3 which can be described as discharge resistors effective for discharging the gate capacitance that has charged during the positive drive period for the related portion of the drive circuits illustrated in FIG. 2. Zener diodes D1 and D2 connected to the gate terminal of a first MOSFET transistor D1 and zener diodes D3 and D4 connected to the gate terminal of a second MOSFET transistor Q2 are effective for providing negative voltage clamping and positive voltage clamping for maintaining the gate voltages of the MOSFETs Q1 and Q2 to within their rated settings. A voltage source of 170 volts DC is connected across the terminals designated B+ and B− as shown connected to the upper and lower drive transistors portions. Resistors R4 and R6 are connected to the gate terminals of the respective MOSFET transistors Q1 and Q2 in order to limit the in-rush current to the respective gate terminals.

The alternative switching on and switching off of the upper and lower drive portions containing the respective MOSFET transistors, in effect, provides a sinusoidal current output waveform on line 76. Also disposed on line 76 are an inductor L1 and parallel disposed capacitors C1 through C3 which serve the purpose of providing filtering and isolation for the switching amplifier 38. Additionally, capacitors C4 and C5, connected across the terminals of a primary winding of an output transformer T2 provide additional filtering. Connected across the terminals of the secondary winding of the output transformer T2 is a line matching element shown diagrammatically as reference 80. The line matching element 80 allows for selective setting of the output impedance of the switching amplifier 38 for matching with the impedance of the power line 46.

Disposed on the return line of the output transformer 78 is a single turn primary winding of a saturable core transformer 48. The saturable core transformer 48 is effective for intercepting a current value proportionate to the magnitude of the output current waveform and which serves the purpose of sensing an overcurrent condition representative of a fault condition of the power line 46. The secondary of the saturable core transformer 48 has connected thereacross, a rectifier circuit which includes diodes D9 through D12 as well as a zener diode D13 and a resistor R11 connected in parallel to the rectifier 82 so that a voltage signal proportionate to the intercepted current signal is made available for use in the current sensing circuit 50.

Figure 3A:
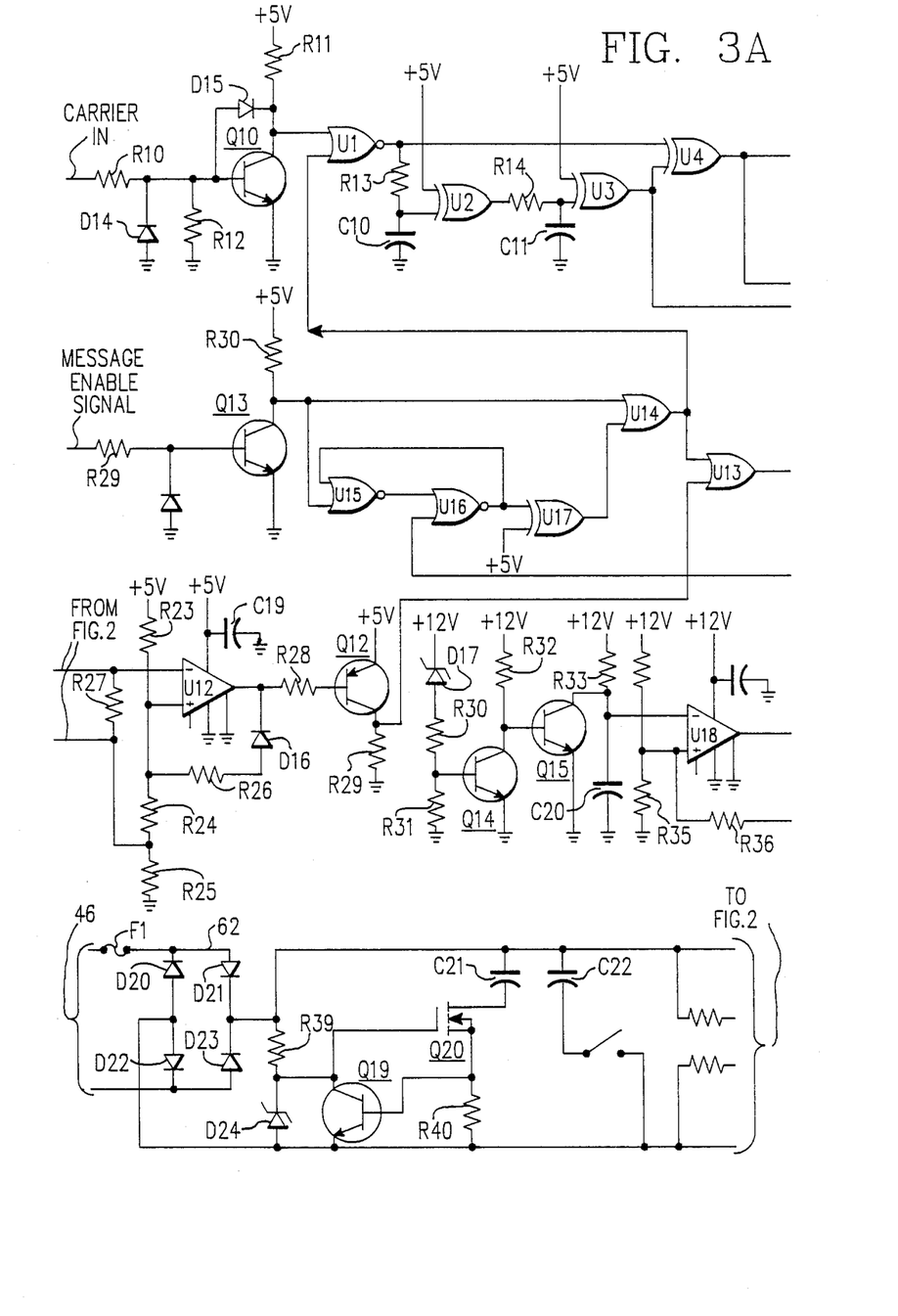
FIGS. 3a and 3b, are schematic diagrams of the switching amplifier control apparatus constructed in accordance with the invention.
Figure 4:
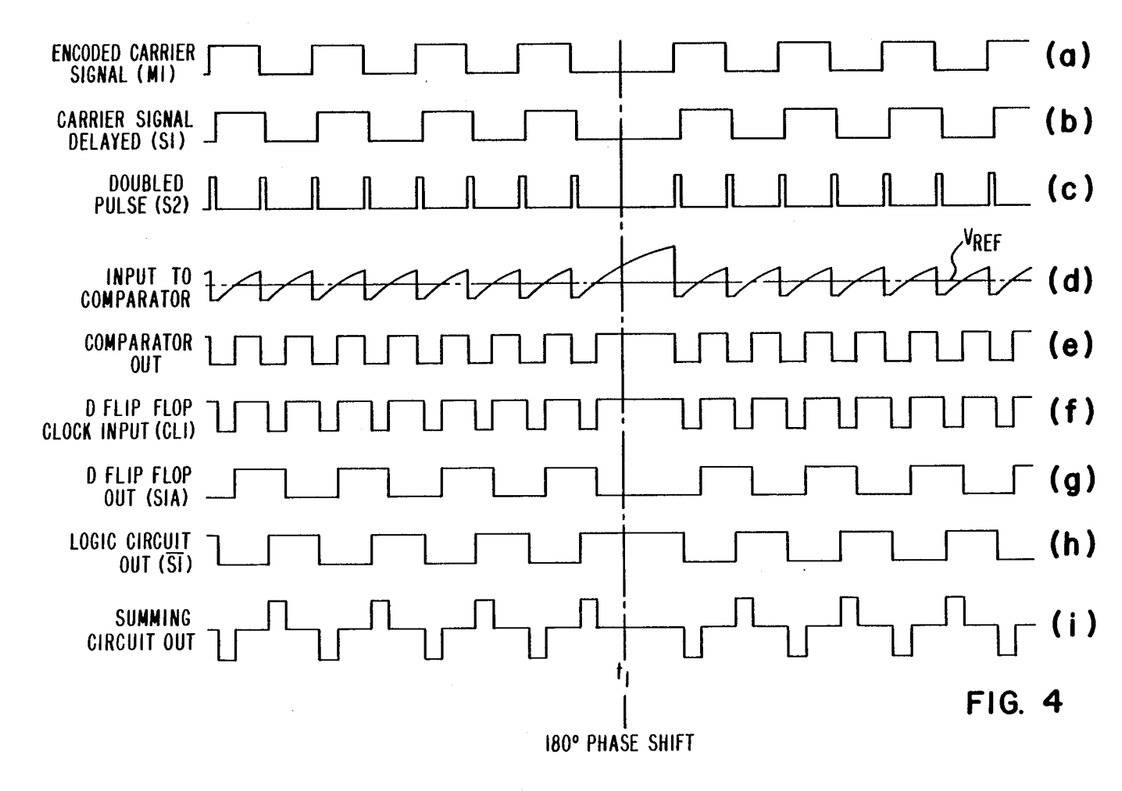

The three state outputs of the switching amplifier control apparatus, which are fed over current limiting resistor R1 to the switching amplifier arrangement shown in FIG. 2, and which are essential to the amplification of the carrier signal M1 as well as the protection of the drive transistors of the switching amplifier must be accomplished by use of a unipolar waveform as is the makeup of the carrier signal M1 shown in FIG. 4 as waveform A. In order to achieve this three state output of the carrier signal M1, it is necessary to first divide the carrier signal M1. For this purpose, the synchronous pulse doubler element 14 of FIG. 1 is shown in detail in FIG. 3A and includes at its input, a transistor Q10 which receives the carrier signal M1 over a resistor R10 connected to the base terminal of transistor Q10. Connected to the collector terminal of transistor Q10, across a resistor R11, is a +5 volt DC source. By turning transistor Q10 on as a function of the reception of a positive going signal portion of the carrier signal M1, the signal level at the collector terminal of transistor Q10 is controlled such that an inverse waveform relative to the carrier signal M1 is achieved at the collector of transistor Q10. In other words, when the carrier signal is at a logical 1 level, the collector terminal of transistor Q10 is at a logical zero level and vise versa. The collector terminal of transistor Q10 is connected as one input to a NOR gate U1 which has as its second input a signal representative of the expiration of the power up time delay and the presence of the enable signal from the message generator 10. Since the one input to NOR gate U1 is an inverse of the carrier signal M1 and the other input is a logical zero under normal operating conditions, the output of NOR gate U1 is equivalent to the carrier signal.

At this point, the output of the NOR gate U1 follows two paths, the first of which is connected over a first RC timing circuit RC1 which includes resistor R13 and capacitor C10 and is connected to one input of a first exclusive-OR gate U2. Connected to the second input of the first exclusive OR gate U2 is the +5 volt DC source which thereby results in the output of the exclusive-OR gate U2 being the inverse of the carrier signal M1 delayed in time by the time constant of the first RC circuit RC1. The output of the first exclusive-OR gate U2 is connected to a second RC timing circuit RC2 which includes a resistor R14 and a capacitor C11. By connecting the delayed inverted carrier signal over the second RC timing circuit RC2 to one input of a second exclusive-OR gate U3 which has as its second input the +5 volt DC source, the output of the second exclusive-OR gate U3 becomes a replica of the carrier signal M1; however, it is delayed in time by the sum of the timing constants of the first and second RC timing circuits RC1 and RC2. The output of the second exclusive-OR gate U3 constitutes the first delayed signal S1 and is shown as waveform B in FIG. 4.

The output of NOR gate U1 is also connected to one input of a third exclusive-OR gate U4 which has as its second input the first delayed signal S1. By connecting the carrier signal M1 to one input of the third exclusive-OR gate U4 and the first delayed signal S1 to the other input of the exclusive-OR gate U4, the output signal resulting therefrom constitutes the doubled signal S2 which is equivalent to the first delayed signal S1 both in phase and in magnitude but occurs at twice the frequency of the first delay signal S1 since a pulse is generated at the output of the third exclusive-OR gate U4 upon the occurrence of each leading and trailing edge of the carrier signal M1. The output waveform from the third exclusive-OR gate U4 which is the doubled signal S2, is seen in FIG. 4 as waveform C. It can be appreciated that the symmetrical relationship of the delayed signal S1 and the doubled signal S2 to the carrier signal M1 which is seen in FIGS. 4 4A through 4C, is such that the signal which will eventually be communicated to the switching amplifier as the three state representation of the carrier signal M1, will in fact, be in phase with the carrier signal M1 and will thus result in a sinusoidal output signal being output onto the power line which contain the exact PSK encoded information as the actual carrier signal M1 but which will be a variation of the carrier signal M1 in terms of magnitude, this variation being achieved by means of the variable output level control circuit 24.

This doubled signal S2 is connected from the third exclusive OR gate U4 over a resistor R15 to the base terminal of a transistor Q11 which forms a portion of the pulse delay circuit 22. The transistor Q11 is thereby alternatively turned on and off synchronously with the occurrence of the pulses of the doubled signal S2. Connected to the collector terminal of transistor Q11 is a third RC timing circuit RC3 which includes resistor R17 and capacitor C12 which, by this connection, is allowed to charge and discharge synchronously with the pulses of the doubled signal S2 as is shown in waveform D of FIG. 4.

The third RC timing circuit RC3 is connected to the non-inverting input of an operational amplifier configured in the manner of a comparator and designated reference U5, this connection resulting in the voltage input to the comparator U5 being the voltage across capacitor C12 which is synchronously charged and discharged in an exponential manner for every half cycle of the carrier signal M1.

Connected to the inverting input of comparator U5 is a reference voltage $V_{REF}$ which can be selectively adjusted by means of a potentiometer R18. In this manner, the setting of potentiometer R18 determines the reference voltage $V_{REF}$ at which the comparator U5 will trigger. As the third RC timing circuit RC3 continually charges and discharges for every half cycle of the carrier signal M1, the same delay is thereby established for each of such half cycles. The symmetry of the output waveform is thus assured by means of a single adjustment through potentiometer R18 in cooperation with the third RC timing circuit RC3 which determines the half cycle delay. In other words, rather than needing a separate delay adjusting element for each half cycle of the carrier signal M1, which would certainly result in different delays since the delay element tolerances could not be maintained to a precise degree, one single adjustment accommodates the entire delay scheme. It is known that if the delays in the half cycles differ, after a certain number of cycles, the differences would amount to an undesired shift in the information content of the carrier signal M1.

According to this input signal configuration, the output of comparator U5 which is shown as waveform E of FIG. 4, will be a logical one when the sampled data signal; that is, the voltage across capacitor C12 exceeds the reference voltage $V_{REF}$. Therefore, by adjusting the reference voltage higher, one can increase the delay of the occurrence of the logical one output of the comparator U5; in other words, the sampled signal will not exceed the reference voltage $V_{REF}$ until a later time. Conversely, by lowering the reference voltage, the comparator U5 will assume the logical one output at an earlier time thereby decreasing this delay. The magnitude of this delay, as will be described hereinafter in further detail, establishes the duration of the pulse presented to the switching amplifier.

It should first be noted that the magnitude of the output current from the switching amplifier which is a sinusoidal waveform, is determined by the carrier signal available at the current transformer 40. If this carrier signal is modified as to the duration of the pulses which are available at the transformer 40, the magnitude of the output current waveform will be affected accordingly. Therefore, if one were to control the delay factor associated with the information bit presented to the current transformer 40, one could control the output of the switching amplifier 38 by means of controlling this amount of delay.

So that the output of the comparator U5 can be effective at all times for forwarding the carrier signal M1 through the switching amplifier control apparatus which is the subject of this invention, this comparator output is logically ORed with the doubled signal S2. Absent this provision, it can be appreciated that if the setting of the reference voltage $V_{REF}$ is adjusted higher than the voltage across capacitor C12 can attain during the half cycle of the carrier signal, the comparator output will remain at a logical zero for all times. An OR gate U6 which receives the comparator output and the doubled signal S2 therefore insures that at least the doubled signal S2 is available for use as an input to a delay type flip-flop U7.

The output of OR gate U6, shown as waveform F of FIG. 4, is connected to the clock input of the delay type flip-flop U7 with the first delayed signal S1 being connected to the data input of the delay flip-flop U7. By the use of delay flip-flop U7, in this manner, the first delayed signal S1 is delayed relative to the leading edge of the carrier signal M1 from being presented at the output of the delay flip-flop U7. The amount of this delay is equivalent to the delay factor which was previously discussed as being determined as a function of the setting of the reference voltage $V_{REF}$ and which represents the delay in starting the high portion of the output of OR gate U6 relative to the start of the first delayed signal S1. The output of the OR gate U6 will hereinafter be referred to as clock pulse CL1. The delay assures that the output of the delay flip-flop U7 which is referred to as the second delayed signal S1A and is shown as waveform G of FIG. 4 is a replica of the carrier signal M1 but is delayed by the delay time.

It should now be noted that one of the advantages of controlling the output waveform of the switching amplifier 38 is that the relative harmonic content of the output waveform can also be controlled. Since the magnitude of the harmonic content of the waveform is never greater than that which it is when the output waveform is at its maximum duty cycle, by adjusting the magnitude of the waveform duty cycle, the relative harmonic content of the waveform can be adjusted as well. This relationship can be seen by use of the following equation:

$$a_n = \frac{2(B^+ - B^-)}{n\pi} \sin \frac{n(\pi - \delta)}{2}$$

where:
n is the harmonic and
$\delta$ is the delay in radians, $0 < \delta < \pi$ The relative distortion will vary as a sine function of the delay ($\delta$). Therefore, the relative distortion will increase or decrease as the delay ($\delta$) is varied, $0 < \delta < \pi$. The magnitude of the total energy outside the fundamental is always decreasing; however, a specific harmonic may increase or decrease as the delay is varied.

The output of the delay flip-flop U7, which is the second delayed signal S1A, is connected, along with the first delayed signal S1 to the logic circuit portion 24 of the variable output level control circuit 20. The logic circuit portion 24 is effective for conditioning the two delayed signals S1 and S1A such that the summing amplifier 26 can generate the three state output signal on which this switching amplifier control apparatus operates.

The logic circuit portion 24 includes a logic OR gate U8 which has as one input, the second delayed signal S1A and as the other input, the enable signal which under normal conditions is a logical zero. Also included in the logic circuit portion 24 is a logical NOR gate U9 which has as one input, the first delayed signal S1 and as the other input, the enable signal.

It should be noted at this time that the logic circuit portion 24 is effective for conditioning the two delayed signals S1 and S1A under two separate and distinct situations which can be but are not necessarily interrelated.

The first situation occurs under normal operating conditions and is the condition previously discussed where it is possible to control the magnitude of the output waveform so that the relative harmonic content of that waveform is controlled consequent therewith. This controlling situation is accomplished by means of modifying the duty cycle of the carrier signal M1 such that the magnitude of the output waveform is effected.

The second situation is the fault condition wherein one of the previously discussed three faults is recognized, the most critical of which may exist on the power line and which may for instance be a short circuit or low impedance condition. In any of the fault conditions, it is desired to modify the output of the logic circuit portion 24 such that the third possible state; that is, the zero output of the summing amplifier 28 is provided. For this purpose, the enable signal which under fault conditions is a logical one, is logically combined with the two delay signals S1 and S1A so that the two delay signals attain output levels which are 180° out of phase to one another. It should be understood that since these two situations are not interrelated and are not mutually exclusive, should both situations occur simultaneously, one must take preference to the other. Accordingly, since the enable signal as a logical one signifies the occurrence of a fault condition, the enable signal will establish a total shutdown of the switching amplifier rather than just a reduction in the magnitude of the switching amplifier.

The actual operation of the logic circuit portion 24 can be best described by way of an example which will now be done with reference to the waveforms of FIG. 4 and under the conditions of the previously discussed first situation wherein it is desired to reduce the magnitude of the output current waveform. In this example, it is presumed that a reduction of the output current waveform is desired.

Figure 3B:
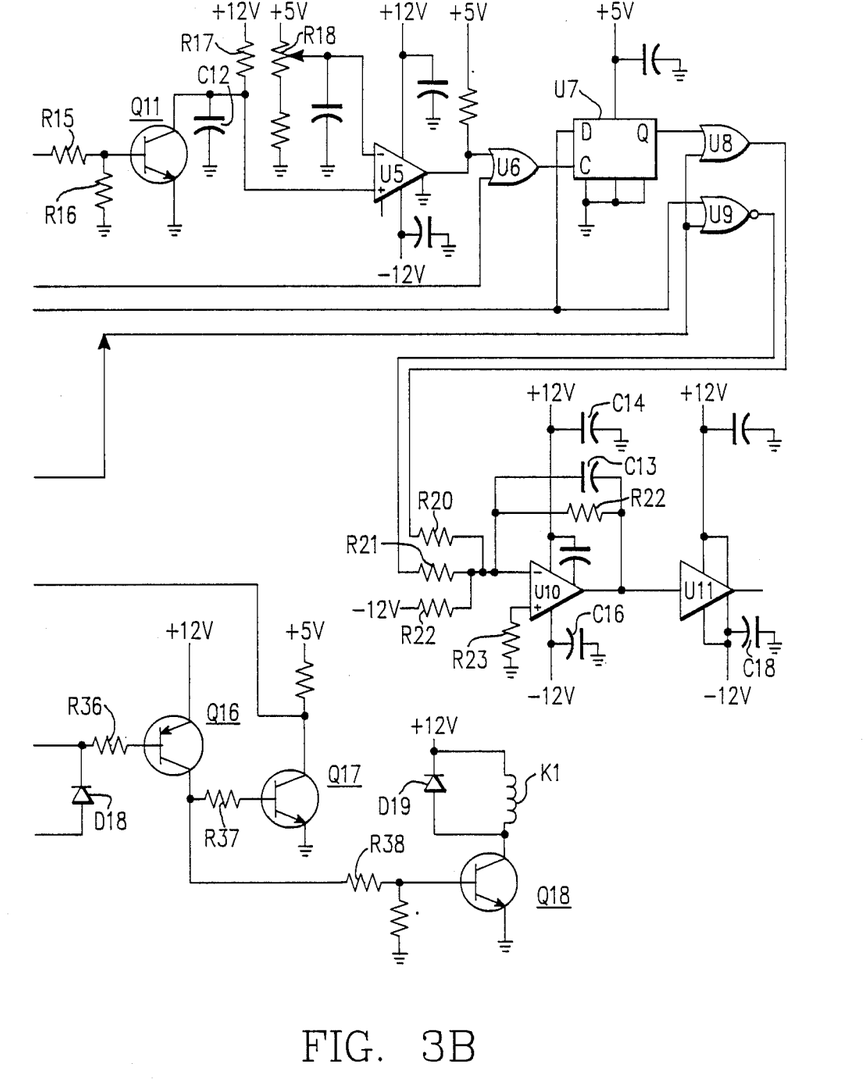

As seen in FIG. 4, the output of OR gate U8 is the second delayed signal S1A shown as waveform G and the output of the NOR gate U9 is the inverse of the delayed first signal S1 shown as waveform H, the inverse delayed first signal S1 being referred to as $\overline{S1}$. Referring now to FIG. 3, these two logic circuit outputs S1A and $\overline{S1}$ are connected over a parallel disposed resistor circuit consisting of resistors R19 and R20, to the inverting input of an operational amplifier U10 configured in the manner to achieve the summing amplifier 28. Also connected in parallel with resistors R19 and 20 is a resistor R21 which is supplied at one terminal by a −12 volt DC source and which acts as a DC offset. A parallel disposed capacitor and resistor circuit C13 and R22 are connected from the inverting input to the output of the summing amplifier U10 so that the operational amplifier can act in the manner of a summing amplifier. Connected to the non-inverting input of the summing amplifier U10 is a resistor R23 which is connected to ground. Capacitors C14 through C16 are also connected to the summing amplifier U10 in a conventional manner so that they perform the function of coupling capacitors.

By way of the selection of the resistance values for resistors R19 through R21, the creation of the three state output of the summing amplifier U10 is accomplished according to the phase and logic relationship of the two delayed signals S1A and $\overline{S1}$ previously detailed. It is known that resistors R19 and R20 must be equivalent in order to provide equal weighting for these two delayed signals $\overline{S1}$ and S1A. An example of the three state output of the summing amplifier is shown in FIG. 4 as waveform I.

Waveform I, which is a bipolar digital pulse, includes information not only relating to the carrier signal M1 but additionally contains information relating to the control of the magnitude of the output current waveform which reflects operation of the switching amplifier control apparatus during harmonic distortion and short circuit or low impedance conditions, is connected to the current amplifier 34 shown in FIG. 3 as reference U11, which serves to provide drive current for the switching amplifier shown in FIG. 2.

It will be noted that because of the delay shown in waveform G of FIG. 4 as δ and which was introduced by the setting of potentiometer R18, the two signal outputs of the logic circuit 24 will be out of phase to one another for a portion of each half cycle of the carrier signal M1. As such, the output of the switching amplifier control apparatus to the switching amplifier 38 includes a portion having a zero output which causes a reduction of the output current waveform since, for the delay portion of each half cycle, the MOSFET drive transistors Q1 through Q4 are disabled.

It can be appreciated that when the delay factor δ is set for the entire duration of the half cycle pulse, the two output signals of the logic circuit 24 will be equivalent thereby resulting in an entirely bipolar digital pulse signal being communicated from the switching amplifier control apparatus to the switching amplifier 38. During this period of operation, the MOSFET drive transistors Q1 through Q4 of the switching amplifier 38 are alternatively turned on and off at all times so that the output current waveform will attain the peak output current value.

In addition to the two previously discussed operating conditions, the peak operating condition and the reduced operating condition, a third situation is possible which is the previously discussed short circuit or low impedance operating condition associated with the power line 46. It will be remembered that under this condition, the magnitude of the output current waveform can fluctuate to the extent that the MOSFET drive transistors Q1 through Q4 could be subjected to a potentially destructive condition.

As discussed with reference to the saturable core current transformer 48 shown in FIG. 2 and the current sensing circuit 50 shown in FIG. 1, the condition of the power line 46 is sensed by way of sampling the current flow in the switching amplifier 38 and feeding a voltage signal representative of the magnitude of this current flow back over feedback line 52 to the current sensing circuit 50. It is understood that a short circuit or low impedance condition will cause a significant increase in the magnitude of the output current waveform. This magnitude is converted by way of rectifier 82 and resistor R9 into a voltage signal which is connected to the inverting input of an operational amplifier U12 which is configured in the manner of a comparator.

Connected to the non-inverting input of the comparator U12 associated with the current sensing circuit 50 is a second reference voltage $V_{R2}$ which is developed across a voltage dividing circuit consisting of resistors R23 through R25. The voltage dividing circuit is supplied from the +5 volt DC source and the second reference voltage $V_{R2}$ is connected to the non-inverting input from a point between resistors R23 and R24 to the output of the comparator U12 to provide positive feedback for the comparator circuit in a conventional manner. A resistor R27 is connected in parallel to resistor R9 disposed across the two output terminals of rectifier 82 which resistor R27 is effective for further developing the voltage signal input to the inverting input of comparator U12.

It should be noted that by configuring the comparator U12 with a feedback line having a diode D16 and resistor R26 disposed therein, an inherent hysteresis of the output of comparator U12 is achieved whereby the number of possible occurrences of a limit signal for each cycle of the carrier signal M1 is limited. In this manner, the magnitude of the output current waveform is more closely controlled than that which is achieved by the use of the present method where a relatively large number of overcurrent and current limiting operations can occur for each cycle of the carrier signal M1, this type of operation having the affect of increasing the heating conditions under which the MOSFET drive transistors Q1 through Q4 must be subjected.

The output of comparator U12 is connected over a resistor R28 to a base terminal of a bipolar transistor Q12 such that when the voltage signal representative of the current flowing in the switching amplifier 38 exceeding a predetermined threshold level determined to be reference voltage $V_{R2}$ by the voltage dividing circuit, a logic 1 output of comparator U12 turns on transistor Q12. The emitter terminal of transistor Q12 is connected over signal line 54 to an input of an OR gate U13 which makes up a portion of the enable circuit 56. In this manner, turning on transistor Q12 signifies the occurrence of the line fault condition which is one of the three conditions that result in the removal of the enable signal thereby disabling the switching amplifier.

The enable circuit 56 is effective following initial actuation of the switching amplifier control apparatus and upon reception of the message enable signal from the message generator 10, for providing the enable signal to the synchronous pulse doubler circuit 14. In a type of handshake arrangement, the message enable signal from the message generator 10 is connected to the enable circuit 56 which includes at an input portion, a resistor R29 connected to the base of a bipolar transistor Q13. Since the message enable signal remains at a logic 1 level for the entire operating time of the switching amplifier control apparatus, the base of transistor Q13 is always biased such that transistor Q13 always conducts from the collector to the emitter terminal. Connected to the collector terminal of transistor Q13 is a resistor R3Q over which the transistor Q13 is provided with the +5 volt DC voltage source. Also connected to the collector terminal of transistor Q13 is one input of a logical OR gate U14 and additionally, one input of a logical NOR gate U15. This transistor Q13, biased to an on condition, thus inputs to OR gate U14, a logical one, so that under normal operating conditions the output of OR gate U14 is a logical one and acts to enable the synchronous pulse doubler circuit 14. Connected to the second input of OR gate U14, is an output of an exclusive-OR gate U17. When the exclusive-OR gate U17 outputs a Logic 1, OR gate U14 is driven to a logic ZERO and the pulse doubler circuit 14 is thereby disabled, the exclusive-OR gate U17 outputs a Logic 1 when the message enable signal has been received and following expiration of the power-up time delay.

The logic NOR gate U15 in conjunction with another logic NOR gate U16 and an exclusive OR gate U17 ensure that the enable circuit 56 will prevent operation of the switching amplifier control apparatus until such time as the power up time delay has expired and the message enable signal has been subsequently received from the message generator 10. It will be remembered that the enable circuit 56 will prevent operation of the switching amplifier control apparatus if the message enable signal is received before the expiration of the power up time delay. This timing relationship is accomplished by connecting the power up enable signal which is a logical one before expiration of the power up time delay and a logical zero following expiration of the power up time delay to one input of NOR gate U16. By connecting the collector terminal of transistor Q13 to an input of NOR gate U15, the output of NOR gate U15 to the other input of NOR gate U16, the output of NOR gate U16 to both an input of NOR gate U15 and an input of the exclusive-OR gate U17, a logic one will be output from exclusive-OR gate U17 unless the message enable signal is received following expiration of the power up time delay signal. The output of exclusive OR gate U17 is logically ORed with the signal connected from the collector terminal of transistor Q13 such that, unless both inputs to OR gate U14 are at a logical zero, the enable circuit 56 will prevent operation of the synchronous pulse doubler element 14 and will modify the logic operation of logic circuit 24 such that an output current waveform from the switching amplifier 38 will be prevented.

The enable circuit 56 also includes a logic OR gate U13 which has as its inputs, the output of OR gate U14 which indicates the occurrence of the message enable signal from the message generator 10 relative to the power up time delay signal, and the limit signal output from the current sensing circuit 60. It will be noted that since the limit signal can only occur following enablement of the switching amplifier control apparatus, the limit signal and the inverse of the power up time delay signal which appears at the output of exclusive-OR gate U17, are mutually exclusive and cannot occur simultaneously relative to one another.

The power up time delay signal which insures that the carrier signal M1 cannot be injected onto the power line 46 until a sufficient settling time has run, is generated by use of a fourth RC timing circuit RC4 which consists of resistor R31 and capacitor C20. The charging of timing circuit RC4 is controlled as a function of the operation of transistors Q14 and Q15 which are configured so that only after Q14 has been turned on by the +12 volt DC source exceeding the breakover point of a zener diode D17 can transistor Q15 be turned on. It should be noted that the power up time delay signal can also be generated following a drop in the 12 volt supply to below a preselected threshold. Therefore, the power-up time delay signal can inhibit operation of the switching amplifier not only during start-up times, but also when the 12 volt supply drops below a certain voltage output. These two transistors, Q14 and Q15, therefore are actuated upon turning the switching amplifier control apparatus on and supplying a +12 volt DC source to the respective base terminals such that the voltage across capacitor C20 is charged in relation to the conducting capabilities of transistors Q14 and Q15.

This voltage developed across capacitor C20 is connected to the inverting input of an operational amplifier configured in the manner of a comparator and designated as reference U18. Connected to the non-inverting input of comparator U18 is a power up reference voltage hereinafter designated $V_{R3}$ which is taken from between resistors R32 and R33. Resistors R32 and R33 are connected in the manner of a voltage divider and are supplied from the +12 volt DC source. By this input configuration, the output of comparator U18 becomes a logic 1 when the voltage across capacitor C20 is charged to a value greater than that of the power up reference voltage $V_{R3}$.

The output of comparator U18 is connected over a resistor R34 to the base terminal of a transistor Q16 which, with the output of comparator U18 at a logic 1, turns transistor Q16 on. Q16 is a PNP type transistor which has the +12 volt DC source connected to its emitter terminal. Connected over a resistor R37 to the collector terminal of transistor Q16 is the base terminal of a transistor Q17 which, when turned on by the fact that Q16 is turned on, acts to extinguish the power up delay signal to the enable circuit 56. With transistor Q17 on, the voltage level at the collector terminal is the voltage across the collector to the emitter junction which is seen as a logic 0. Also connected to the collector terminal of transistor Q16 over a resistor R38 is a transistor Q18 which has connected to its collector terminal, one terminal of a coil K1, the other terminal of which is connected to the +12 volt DC source.

The coil K1 is effective for cooperatively engaging the power up time delay 58 to the power up current limiting circuit 60 in which the contact associated with coil K1 is disposed. The power up current limiting circuit 60 includes a rectifier circuit 62 having diodes D20 through D23 and is effective for rectifying the sinusoidal waveform from the power line 46. A resistor R39 and zener diode D24 are connected to the output of the rectifier 62 for purposes of providing a constant voltage signal representative of the rectified sinusoidal current waveform. This constant voltage signal is connected to a transistor arrangement consisting of a MOSFET transistor Q20 and a bipolar transistor Q19. MOSFET transistor Q20 and bipolar transistor Q19 are cross connected; that is, the gate terminal of MOSFET Q20 is connected to the collector terminal of transistor Q19 which receives the constant voltage signal from the resistor diode arrangement R39/D24 and the source terminal of MOSFET Q20 is connected to the base terminal of transistor Q19 with a resistor R40 being connected from this point to ground. Connected to the drain terminal of MOSFET transistor Q20 are two parallel disposed power capacitors C21 and C22 which are charged to the operating voltage of the switching amplifier 38; this voltage level being the 170 volt DC voltage available across the B+ and B— terminals as seen in FIG. 2.

In order to limit the charging current available to the power capacitors C21 and C22 during a power up condition and to thereby assure that these capacitors C21 and C22 are fully charged, MOSFET transistor Q20 and transistor Q19 control the charging operation initially. However, with the contact of coil K1 disposed in parallel across the MOSFET transistor Q20 and transistor Q19, when this contact is closed following expiration of the power up time delay, MOSFET transistor Q20 and transistor Q19 are effectively removed from operation and capacitors C21 and C22 are charged to maintain the +170 volt DC operating voltage accordingly.

The operation of the switching amplifier control apparatus which is the subject of this invention will now be described with reference to the previously described normal operation condition illustrated by way of waveforms i, j and the overcurrent condition caused by the short circuit or low impedance condition.

In both situations, the enable signal necessary to enable operation of the synchronous pulse doubler circuit 14 is presumed to be present. At this time, the synchronous pulse doubler circuit 14 receives the carrier signal M1 and is effective for generating the first delayed signal S1 and the synchronous doubled pulse S2. The doubled signal S2 is effective for controlling the charging and discharging of the third RC time circuit RC3 contained within the pulse delay circuit 22. The RC time constant associated with the third RC timing circuit RC3 is effective for establishing a bit time delay by which the first delayed signal S1 can be further delayed in time creating a second delayed signal S1A. The second delayed signal S1A is logically ORed with the inverse of the enable signal, the disable signal, which reflects an overcurrent condition but for which under normal conditions is zero. Additionally, the first delayed signal S1 is logically NORed with this disable signal which, since this is again a logic 0, results in an inverse of the first delayed signal S1.

This logic OR and NOR operation is performed within the logic circuit 24 and effectively conditions the first and second delayed signals S1 and S1A for input to the summing amplifier U10.

The summing amplifier U10 is configured so as to provide a positive voltage signal out when the first and second delayed signals S1 and S1A are in phase as logical zeros; a negative voltage signal out when the signals are in phase as logic ones and a zero voltage out when the signals are out of phase. In this manner, under normal operating conditions, the output of summing amplifier U10 for the given carrier signal M1 is the waveform i shown in FIG. 4. After being amplified by current amplifier U11, waveform i is connected to the primary winding 70 of current transformer 40. It is known that, by biasing the MOSFET transistors Q1 through Q4 with the voltage levels and polarities shown in FIG. 2, the MOSFET transistors Q1 and Q2 are turned on when the input signal i is in the positive going region at which time MOSFET transistors Q3 and Q4 are turned off. Alternatively, when the input signal i is in the negative going region, MOSFETs Q3 and Q4 are turned on and MOSFET transistors Q1 and Q2 are turned off. By this arrangement, the output of the drive transistor portion 42, which is available at line 76 of the switching amplifier 38, is a sinusoidal current output waveform. It will be noted that in using a PSK-type communication scheme, a 180° phase shift necessary to distinguish between information bits is shown as occurring at time $t_1$ in FIG. 4 where the corresponding shift for all operating signals is shown in the various waveforms.

If a short circuit or low impedance condition were to arise in the power line 46, the magnitude of the output current waveform would increase. By way of saturable core transformer 48 and rectifier 82 with the associated resistor R9 and zener diode D13, this increased magnitude would be sensed as an increased voltage signal input to comparator U12 so that the current sensing circuit 50 would output a current limiting signal to OR gate U17 of the enable circuit 56. This would result in an inverse enable signal which would then be output to the logic circuit 24. By way of the opposing treatment of the first and second delay signals; that is, by way of logically ORing one signal and logically NORing the other signal with the inverse of the enable signal, the first and second delay signals S1 and S1A will assume output conditions from the logic circuit 24 which are out of phase with one another. The out-of-phase outputs of the logic circuit 24 when connected to the summing amplifier U11, result in a zero output level from the summing amplifier U11. As configured, the MOSFET transistors Q1 through Q4, when a zero voltage input signal is present, are all turned off.

It should be noted here that, though the MOSFET transistors Q1 through Q4 are turned off when the enable signal becomes the disable signal, the output current waveform does not immediately go to a zero value but instead merely decreases. As the magnitude decreases below a preset threshold value, the disable signal will be removed and the output of summing amplifier U11 will revert to the normal waveform i of FIG. 4 such that, the MOSFET transistors Q1 through Q4 will again be rendered conducting. By the configuration of the current-sensing circuit 50, the establishment and subsequent removal of the disable signal caused by an overcurrent condition can occur approximately three times during each half cycle of the carrier signal M1. By this hysteresis arrangement of the comparator U12, it can be seen that the overheating of the MOSFET transistors Q1 through Q4 caused by merely reversing the drive of the transistors Q1 through Q4 is avoided when the MOSFET transistors are turned off for a limited number of times during the operation of the carrier signal M1.

For the situation where there is a continuous short circuit or low impedance condition present on the power line 46, the disable signal will effectively maintain the magnitude of the sinusoidal output current waveform to an acceptable limit, by continuously conditioning the logic circuit portion 24 to output out of phase logic signals to the summing amplifier 26.

Although the hereinabove described embodiment constitutes a preferred embodiment of the invention, it can be appreciated that modifications can be made thereto without departing from the scope of the invention as detailed in the appended claims. For instance, one such modification would be to provide a software timing arrangement for the power up timing delay accomplished in the preferred embodiment by way of the power up time delay circuit 58.

I claim:

1. An apparatus for controlling the output of an amplifier which is effective for amplifying a signal to be imposed onto a power line, said amplifier controlling apparatus comprising:
   means for generating a message signal having a plurality of information bits contained therein and a preselected frequency and phase associated therewith;
   means for dividing said message signal into at least two signals wherein a first one of said at least two signals is delayed in time by a preselected period of time and a second one of said at least two signals is a synchronized doubled signal having a frequency of two times said message;

means for generating a second delayed signal by delaying said time delayed first signal by a delay time at least equal to the duration of said synchronized doubled signal;

means for generating first and second logic signals as a function of said first and second delayed signals respectively; and, means for summing said first and second logic signals such that, the magnitude of said amplifier output is controlled as a function of the relative delay times between said first and second delayed signals.

2. An amplifier output controlling apparatus as set forth in claim 1 wherein said synchronized doubled signal is generated by logically combining said message signal and said first time delayed signal such that a positive going pulse portion of said synchronized doubled signal occurs for each leading and each trailing edge of said message signal.

3. An amplifier output controlling apparatus as set forth in claim 1 wherein said second delayed signal generating means includes a bit storage element having a first input receptive of said first time delayed signal and a second input receptive of a clock signal, said clock signal being determined as a function of said synchronized doubled signal.

4. An amplifier output controlling apparatus as set forth in claim 3 wherein said bit storage element generates said second time delayed signal by storing said first time delayed signal until the occurrence of said clock signal which commences following expiration of said preselectable time delay.

5. An amplifier output controlling apparatus as set forth in claim 4 wherein said preselectable time delay is determined by a first timing means operably initiated by each pulse portion of said synchronized doubled signal, said first timing means being effective for establishing said preselectable time delay as a single value applicable to each half cycle of said message signal.

6. An amplifier output controlling apparatus as set forth in claim 5 wherein said first timing means includes a first resistor-capacitor timing circuit having a predetermined time constant associated therewith and which is connected to one input of a comparator element, said first timing means also includes a reference voltage circuit connected to a second input of said comparator element and having an adjustable resistor disposed therein which is effective such that upon adjustment, said reference voltage circuit outputs an adjusted reference signal against which said predetermined time constant is compared so as to generate an output of said comparator element which is utilized in developing said clock signal.

7. An amplifier output controlling apparatus as set forth in claim 6 wherein the output of said comparator element is summed with said synchronized doubled signal so that said clock signal is at least equal to said synchronized doubled signal in duration.

8. An apparatus for controlling the output of an amplifier which is effective for amplifying a signal to be imposed onto a power line, said amplifier controlling apparatus comprising:

means for generating a message signal having a plurality of information bits contained therein and having a preselected frequency and phase associated therewith;

means for dividing said message signal into at least two signals wherein a first one of said at least two signals is delayed in time by a preselected period of time and a second one of said at least two signals is a synchronized doubled signal having a frequency of two times said message signal;

means for generating a second delayed signal by delaying said first delayed signal by a preselectable delay time at least equal to the duration of said synchronized doubled signal;

means for generating an enable signal and a disable signal said enable signal representative of an absence of an overcurrent condition on the power line, said disable signal representative of the occurrence of such overcurrent condition;

means for combining said disable signal with said first and second delayed signals so as to produce first and second logic signals which are out of phase with one another; and means for summing said first and second out of phase logic signals such that the output of said amplifier is disabled thereby.

9. An amplifier output controlling apparatus as set forth in claim 8 wherein said combining means includes a first logic element having a first logic function associated therewith and which is receptive of said disable signal and said first delayed signal, said first logic element producing said first logic signal therefrom, said combining means further including a second logic element having a second logic function associated therewith which results in an output that is opposite in phase to that of said first logic function, said second logic element being receptive of said disable signal and said second delayed signal and being effective for producing said second logic signal therefrom, said second logic signal being 180° out of phase with said first logic signal.

10. An amplifier output controlling apparatus as set forth in claim 9 wherein said first logic element is an inverting element and said second logic element is a non-inverting element.

11. An amplifier output controlling apparatus as set forth in claim 9 wherein said overcurrent condition of the power line is sensed by a comparator circuit receptive of a voltage signal at one input, which voltage signal is representative of the amplifier output signal drawn by the power line, said comparator circuit is also receptive of a reference signal at a second input, which reference signal is representative of a threshold level of current in the power line below which said amplifier is operable, said comparator circuit being effective such that, when said voltage signal exceeds said reference signal, said enable signal is converted to said disable signal.

12. An apparatus for controlling the output of an amplifier which is effective for amplifying a signal to be imposed onto a power line, said amplifier controlling apparatus comprising:

means for generating a message signal having a plurality of information bits contained therein and having a preselected frequency and phase associated therewith;

means for dividing said message signal into at least two signals wherein a first one of said at least two signals is delayed in time by a preselected period of time and a second one of said at least two signals is a synchronized doubled signal having a frequency of two times said message signal;

means for generating a second delayed signal by delaying said first delayed signal by a preselectable delay time at least equal to the duration of said synchronized doubled signal;

means for generating an enable signal representative of the expiration of a power-up time delay, said enable signal acting as a disable signal until such time as said power-up time delay expires;

means for combining said disable signal with said first and second delayed signals so as to produce first and second logic signals which are out of phase with one another; and means for summing said first and second out of phase logic signals such that the output of said amplifier is disabled thereby.

13. An amplifier output controlling apparatus as set forth in claim 12 further comprising means for measuring a time duration corresponding to said power-up time delay, said time duration commencing from a time when a system operating voltage above a preselected voltage threshold value has been detected and continuing until the expiration of said power-up time delay.

14. An amplifier output controlling apparatus as set forth in claim 13 further comprising means for supplying said amplifier with an amplifier operating voltage which is substantially higher than said system operating voltage, said voltage supplying means including a plurality of capacitors which are limited as to the amount of voltage that can be developed thereacross until such time as said power-up time delay expires.

15. An amplifier output controlling apparatus as set forth in claim 13 wherein said enable signal generating means and said time measuring means are effective under conditions additional to a power up condition, said other conditions including a condition where said system operating voltage periodically drops beneath said preselected voltage threshold value.

16. A switching amplifier and amplifier control apparatus for use on a power line communication system, comprising:

means for generating a message signal for transmission over said power line communication system, said message signal containing a plurality of information bits and having a preselected frequency and phase associated therewith, said message generating means further generating a message enabling signal in conjunction with said message signal;

means for amplifying said message signal;

means for driving said amplified message signal into said power line communication system;

logic means in electrical communication with said message signal and being effective upon reception of said message enabing signal, for conditioning said message signal such that under normal operating conditions, said message signal can be communicated to said amplifying means;

means for sensing an overcurrent condition at said driving means and generating a current limit signal in response thereto;

means for limiting current through said driving means until the expiration of a power up time delay value, such power up time delay value having a duration which is preselected to a value that allows for component settling;

means for measuring said power up time delay value and generating a power up time delay signal until said power up time delay value has expired; and means for generating an enable signal and a disable signal, generating said enable signal upon sensing the absence of said current limit signal and the absence of said power up time delay signal, said enable and disable signal generating means further being effective such that, upon sensing at least one of said limit current signal and said power up time delay signal, said enable and disable signal generating means generates said disable signal such that said driving means is prevented from communicating said message signal to said power line communication system.

* * * * *